US00RE34146E

United States Patent [19]

Wörner et al.

[11] E Patent Number: Re. 34,146

[45] Reissued Date of Patent: Dec. 22, 1992

[54] FLYWHEELS WITH VIBRATION DAMPING MEANS

[75] Inventors: Günter Wörner, Kernen; Franz Moser, Wendlingen; Ernst Tscheplak, Weinstadt, all of Fed. Rep. of Germany

[73] Assignee: Daimler-Benz Aktiengesellschaft, Fed. Rep. of Germany

[21] Appl. No.: 769,761

[22] Filed: Oct. 4, 1991

Related U.S. Patent Documents

Reissue of:

[64] Patent No.: 4,724,719
Issued: Feb. 16, 1988
Appl. No.: 829,508
Filed: Feb. 14, 1986

U.S. Applications:

[63] Continuation of Ser. No. 246,622, Sep. 20, 1988, abandoned.

[30] Foreign Application Priority Data

Feb. 14, 1985 [DE] Fed. Rep. of Germany ..... 3505069

[51] Int. Cl.[5] ..... F16F 15/10; F16D 11/00; F16D 23/00; F16D 3/14

[52] U.S. Cl. ..... 74/574; 192/30 V; 464/68

[58] Field of Search ..... 74/572, 573 R, 574; 192/30 V, 38; 464/68, 66

[56] References Cited

U.S. PATENT DOCUMENTS

| | | | |
|---|---|---|---|
| 4,274,524 | 6/1981 | Nakane | 74/574 |
| 4,317,435 | 3/1982 | Kohlhage | 74/572 |
| 4,346,773 | 8/1982 | Hofbauer et al. | 74/572 |
| 4,410,074 | 10/1983 | Maucher et al. | 74/572 |

FOREIGN PATENT DOCUMENTS

| | | | |
|---|---|---|---|
| 2814059 | 12/1978 | Fed. Rep. of Germany | 74/574 |
| 2826274 | 4/1982 | Fed. Rep. of Germany | 74/574 |
| 258542 | 5/1928 | Italy | 192/105 C |
| 1212161 | 11/1970 | United Kingdom | 74/574 |
| 1233273 | 5/1971 | United Kingdom | 74/574 |
| 2109085 | 5/1983 | United Kingdom | 74/572 |
| 2141209 | 12/1984 | United Kingdom | 74/574 |

*Primary Examiner*—Rodney H. Bonck
*Attorney, Agent, or Firm*—Evenson, Wands, Edwards, Lenahan & McKeown

[57] ABSTRACT

A split flywheel for reducing the transmission of vibrations from the engine to the drive shaft at certain frequencies of the flywheel is provided. Included are two flywheel elements drivingly connected to one another wherein one of which is connected or can be connected in a driven manner to the engine and the other of which is connected or can be connected in a driven manner to the drive line. The resonant frequency of the split flywheel unit is well below the frequency of engine vibrations which occur during normal traveling, so that only slight amplitudes of vibration occur between the flywheel elements during normal travel operation. However, during start-up of the engine, the resonant frequency of the flywheel is passed through. The drive connection between the elements a slip clutch having a greater friction contact than the maximum torque of the engine, placed in series with a spring mounting and positioned between the two flywheel elements. The slip clutch becomes operative only when the resonant frequency of the flywheel is passed through.

17 Claims, 3 Drawing Sheets

FLYWHEELS WITH VIBRATION DAMPING MEANS

Matter enclosed in heavy brackets [ ] appears in the original patent but forms no part of this reissue specification; matter printed in italics indicates the additions made by reissue.

This is a continuation, application Ser. No. 07/246,622, filed Sep. 20, 1988, now abandoned.

BACKGROUND AND SUMMARY OF THE INVENTION

The invention relates to a device for reducing drive line vibrations excited at the engine, in particular a split flywheel, having two device or flywheel elements which are arranged mutually on the same axis and are coupled to one another in a driven manner by means of a spring mounting. One of the device or flywheel elements is connected to the engine and the other is connected to the transmission (or drive) line. A frictional clutch which is affected by clearance is positioned between the device or flywheel elements.

A corresponding device which is integrated into a clutch connected between the engine and transmission is the subject matter of the German Offenlegungsschrift No. 2,814,059. Moreover, a correspondingly developed, split flywheel is described in the earlier German Patent. Application No. P 34 30 457.6-13 which corresponds to U.S. Pat. No. 4,662,239.

In these known devices, the spring mounting and/or the frictional clutch between the device or flywheel elements are of a relatively rigid design. The stops are arranged for limiting the relative rotation between the device or flywheel parts. Without such a rigid design, there would be the risk of stops colliding with one another, creating noise and shocks in the drive line. Because of the rigid spring mounting, flywheel elements having relatively large masses or moments of inertia must be arranged in the split flywheel. This is because in order to permit a so-called hypercritical state during travel operation, the resonant frequency must be very low and be below the frequency of the vibrations occurring during idling operation. That is, the frequency of the vibrations excited by the engine is clearly above the resonant frequency of the split flywheel. Consequently, the possibility exists that if the clearance of the frictional clutch is of an appropriate size, practically only the spring mounting is active between the flywheel elements during travel operations, and accordingly it is practically impossible for the high frequency vibrations excited by the engine and measured at the resonant frequency of the split flywheel to be transmitted to the rest of the drive line. On the other hand, if it is unavoidable that the resonant range of the flywheel has to be run through when the engine is being started, greater relative rotation of the flywheel parts relative to one another will be damped by the active, frictional clutch. However, the friction contact must become active with a minimum damping force which, as a sudden rise in the torque transmitted between the flywheel elements, leads to a certain discomfort in certain operating conditions.

It is therefore the object of the invention to create a device for reducing drive line vibrations excited at the engine, in particular a split flywheel, in such a way that comfort is clearly increased, especially in the critical ranges, such as partial-load travelling ranges.

To achieve this objective, it is provided according to preferred embodiments of the invention that the abutment of the spring mounting, which abutment is allocated to one device or flywheel element, is arranged on an abutment part which is frictionally connected to this device or flywheel element in a driven manner without limitation of the rotating capacity of the flywheel elements relative to one another, with the force of the frictional contact being greater than the maximum torque of the engine.

The invention is therefore based on the general idea that the strength of the spring mounting between the device or flywheel elements and also the clearance of the frictional clutch preferably arranged between these elements can be apportioned exclusively with regard to a maximum comfort if the device or fly-wheel elements can be rotated relative to one another to any extent. Therefore, considerable relative movements of these elements with respect to one another which could possibly occur in the resonant range can be reduced over a considerable range. At the same time, it is particularly advantageous that this reduction, which takes place against the damping resistance of the friction contact by the relative movement between the abutment member and one device or flywheel element frictionally coupled to it, can come into action smoothly, because even the strength of this resistance can be apportioned exclusively with regard to comfort.

According to preferred embodiments of the invention, the spring mounting is subdivided into at least two spring mounting groups which are connected to one another via an intermediate member which can rotate in spring-like manner relative to the two device or flywheel elements, with the frictional clutch affected by clearance being arranged parallel to at least one spring mounting group between the intermediate member and one of the device or flywheel elements. In this arrangement, the spring mounting can be arranged with a large displacement and corresponding elasticity. At the same time, it is favorable with respect to comfort if the frictional clutch affected by clearance is only arranged parallel to one spring mounting group.

Moreover, it is expedient according to certain preferred embodiments to arrange several frictional clutches having different clearances in parallel connection to enable a progressive increase in friction contact and in the damping connected with the latter during greater relative movements of the device or flywheel elements to one another.

Other objects, advantages and novel features of the present invention will become apparent from the following detailed description of the invention when considered in conjunction with the accompanying drawings.

DETAILED DESCRIPTION OF THE DRAWINGS

Figure 1:
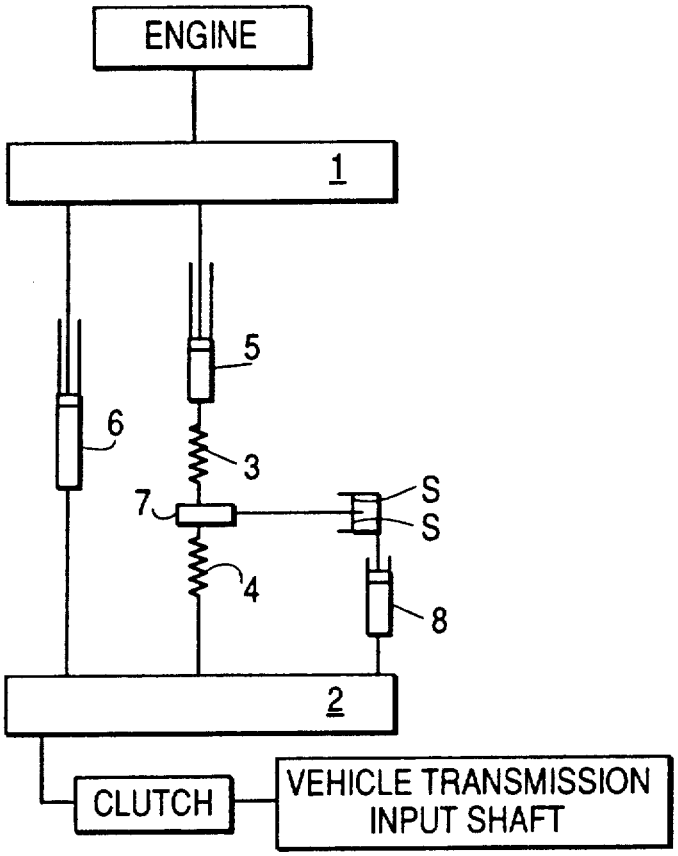
FIG. 1 is a schematic representation of a split flywheel constructed according to a preferred embodiment of the invention.

In FIG. 1, the two flywheel elements 1 and 2 are each shown schematically as heavy bodies which are supported or coupled relative to one another by means of a spring mounting consisting of two spring mounting groups 3 and 4. A slip clutch 5 is connected in series with the spring mounting 3 and 4, which slip clutch 5 enables the flywheel elements 1 and 2 to displace, that is, rotate, relative to one another if an appropriately high torque occurs. At the same time, the frictional contact of the slip clutch 5 is of such proportion that the maximum engine torque occurring during minimal travelling operation can be transmitted without slippage.

Moreover, the flywheel elements 1 and 2 are coupled to one another in weak frictional contact by means of a further slip clutch 6. The slip clutch 6 can even be dispensed with in accordance with certain preferred embodiments of the invention, because an unavoidable frictional resistance inevitably acts as a weak frictional contact between the flywheel elements 1 and 2.

An intermediate member 7 is arranged between the spring mounting groups 3 and 4, which intermediate member 7 is coupled to the flywheel element 2 via a slip clutch 8 having a relatively weak frictional contact-the force of the frictional contact is less than the maximum engine torque to be transmitted. At the same time, the intermediate member 7 is connected to the slip clutch at a clearance of 2 S.

During travelling operation, the flywheel elements 1 and 2 will rotate relative to one another, which in FIG. 1 is shown as an approach or withdrawal of the elements 1 and 2 towards or away from one another.

Insofar as only slight relative movements, that is, vibrations of low amplitude, occur between the flywheel elements 1 and 2, the clearance 2 S available to the intermediate member 7 is not utilized. Accordingly, only the spring mounting 3 and 4 and the (very weak) slip clutch 6 are active between the flywheel elements 1 and 2. This case, which corresponds to the normal travelling operation, enables a practically complete vibrational uncoupling or isolation of the engine from the remaining drive line. That is, the vibration transmitted by the engine, for example, onto the flywheel element 1 do not reach the flywheel element 2 and the drive line connected to it.

The flywheel is adapted such that its resonant frequency is below the frequency of the vibrations which are excited by the engine at idling speed. Accordingly, the resonant frequency of the flywheel will be passed through only when the engine is being started.

At the same time, larger relative movements inevitably occur between the flywheel elements 1 and 2, so that the clearance 2 S available to the intermediate member 7 is used up and intermediate member 7 is only able to displace relative to the flywheel element 2 against the resistance of the slip clutch 8. Accordingly, relative vibrations of greater amplitude which occur between the flywheel elements 1 and 2 are damped to an increased extent.

If during shock-like engagement, for example, a jump start, the flywheel elements 1 and 2 are extensively deflected relative to one another against the resistance of the spring mounting 3 and 4 of the slip clutches 6 and 8, slip clutch 5, responding to the increased torques acting during this operating condition, becomes active and limits the torque which can be transmitted from the flywheel element 1 to the flywheel element 2. During such an operating condition, therefore, the slip clutch 5 will slip to a more or less great extent.

Figure 2:
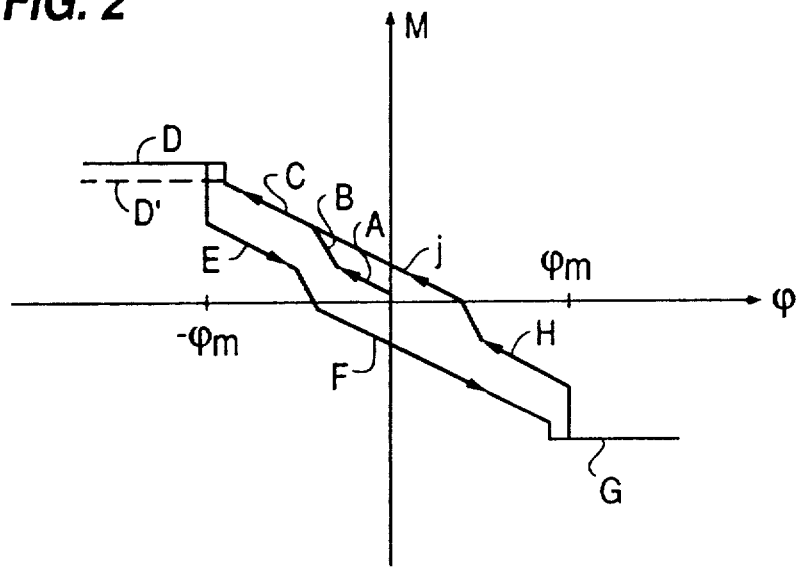
FIG. 2 is a diagram depicting the dependency between the torques (M), acting or to be overcome between the flywheel parts, as a function of the relative deflection (Φ) of the flywheel parts to one another, when constructed in accordance with preferred embodiments of the invention.

The diagram in FIG. 2 shows in detail the functional mode of the flywheel shown in FIG. 1. In this diagram, the torque M active or transmitted between the flywheel elements 1 and 2 is shown as a function of the displacement or rotation ($\Phi$) of the flywheel elements 1 and 2 relative to one another.

Let the flywheel first be located in the center position shown in FIG. 1.

If the flywheel elements 1 and 2 are now to be rotated relative to one another—for example in an approach direction in the representation in FIG. 1—a certain minimum moment must be applied which is given by the frictional contact of the slip clutch 6. An increasing moment is then set up by the spring groups 3 and 4 against further rotation according to the curve section A. As soon as the clearance at which the intermediate member 7 is connected to the slip clutch 8 has been used up, the resistance the slip clutch 8 must additionally be overcome during further rotation of the flywheel elements 1 and 2 relative to one another. However, since the slip clutch 8 is connected in parallel only with the spring mounting 4, the flywheel element 1 can move further relative to the intermediate member 7 with additional loading of the spring mounting 3—curve section B—until the moment of the slip clutch 8 is overcome and intermediate member 7 is in turn moved further relative to the flywheel element 2—curve section C. It is in accordance with preferred embodiments of the invention that, according to the curve section B, a rise in moment occurs and not a moment jump.

As soon as the spring travel of the spring mounting groups 3 and 4 has been used up, the flywheel elements 1 and 2 can nonetheless still be rotated further relative to one another, according to the curve section D, if the torque acting between the flywheel elements 1 and 2 exceeds the resistance of the slip clutch 5. In the example shown, the force of the frictional contact of the slip clutch 5 is set in such a way that a step forms between the curve sections C and D. If the slip clutch is set to a correspondingly weaker frictional contact, a profile according to the curve D' could also result, that is, the resistance of the slip clutch 5 has already been overcome before the spring displacement of the spring mounting groups 3 and 4 has been completely used up.

It is now assumed that the two flywheel elements 1 and 2 have been displaced relative to one another corresponding to an angle—($\Phi_m$). The spring mounting groups 3 and 4 attempt to reset the flywheel elements 1 and 2. This is shown by curve section E. During this restoring movement, the intermediate member 7 can use up its clearance available relative to the slip clutch 8. The flywheel elements 1 and 2 are then also displaced further against the resistance of this slip clutch 8, as shown by the curve section F and the change in moment (similar to section B) between the sections E and F.

Otherwise, the flywheel elements 1 and 2 can be displaced according to the further profile of the curve section F against an increasing resistance produced by the spring mounting groups 3 and 4 until the slip clutch 5 in turn becomes active according to the curve section G.

If the flywheel elements 1 and 2 have then achieved for example, the relative position ($\Phi_m$), the restoring movement takes place according to curves H and I.

Figure 3:
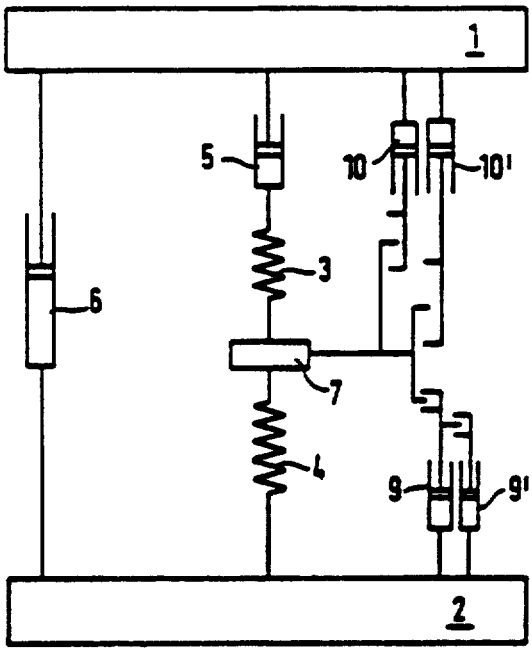
FIG. 3 is a schematic representation of a modified embodiment of the present invention.

FIG. 3 shows a modification of the design principle shown in FIG. 1. Here, two slip clutches 9 and 9' and/or 10 and 10' are each connected in parallel to the spring mounting groups 3 and/or 4. These slip clutches are each connected at different clearances to the intermediate member 7 in such a way that these slip clutches 9 to 10' become active one after the other (i.e. not simultaneously). In the example shown, if the flywheel elements 1 and 2 deflect relative to one another, the slip clutch 9 would become active first, then the slip clutch 9' and then—providing they are available—the slip clutches 10 and 10'.

Figure 4:
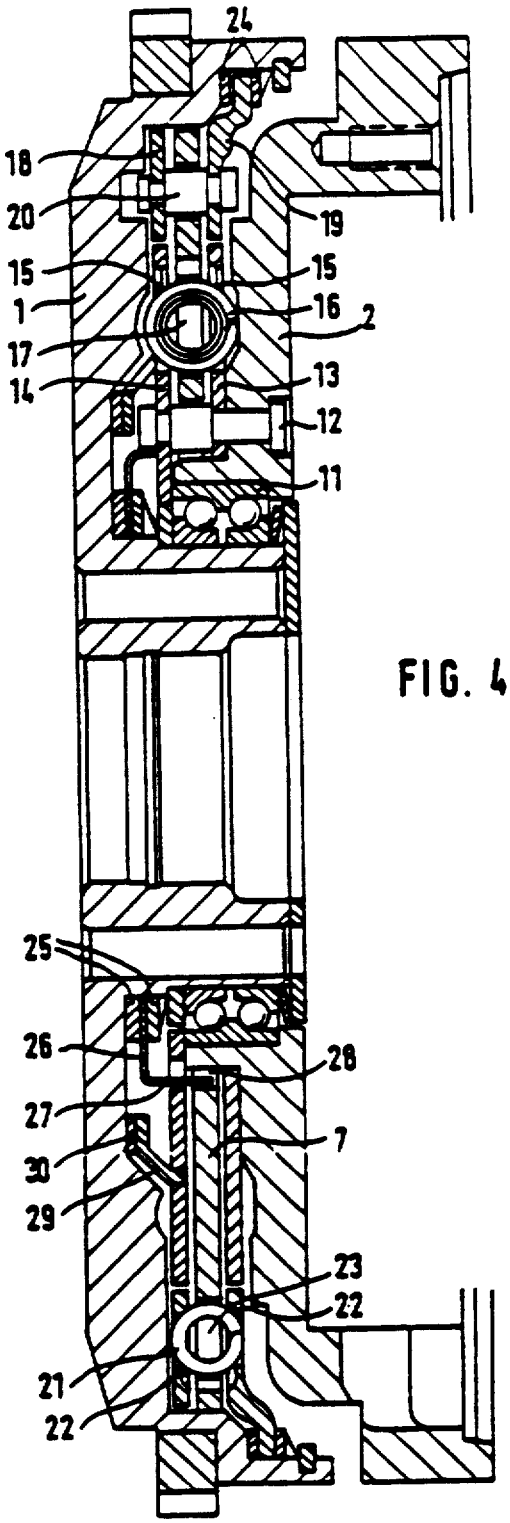
FIG. 4 is an axial sectional view of a flywheel constructed in accordance with a preferred embodiment of the invention according to the design arrangement shown in FIG. 1.

FIG. 4 shows an axial section of a two piece flywheel in which the design principle shown in FIG. 1 has been put into effect.

The flywheel element 1 is directly connected with the engine. The flywheel element 2 is rotatably mounted on the flywheel element 1 by means of a bearing arrangement 11 and can be drivingly connected by a clutch to the input shaft of a drive line or a vehicle transmission or the like.

Two annular disks 13 and 14 are fixed at an axial distance from one another on the flywheel element 2 by means of studs 12. These annular disks 13 and 14 have several windows 15 which extend approximately tangentially to the axis of the flywheel elements 1 and 2 and serve as a cage-like guidance surface for helical springs 16. The diameter of the helical springs 16 is greater than both the axial distance between the annular disks 13 and 14 and also the size of the windows 15 in the radial direction of the annular disks 13 and 14. Moreover, the helical springs 16 are pre-loaded against the windows 15, that is, the front ends of the helical springs [15] *16* are loaded against the facing edges of the windows 15.

The intermediate member 7 shaped as an annular disk is arranged between the annular disks 13 and 14. For accommodating the helical springs 16, this intermediate member 7 has windows 17 corresponding to the windows 15 of the annular disks 13 and 14. If the windows 17 and 15 are in alignment with one another—in the axial view of the flywheel—the helical springs 16 are completely relaxed. On the other hand, if the intermediate member is rotated relative to the annular disks 13 and 14 and thus relative to the flywheel element 2, the springs 16 are pressed together between one edge of the windows 17 and the opposite edges of the windows 15.

In the area of the studs 12, the intermediate member 7 has recesses extended sufficiently far in the peripheral direction, so that the intermediate member 7 can rotate as shown relative to the annular disks 13 and 14 or the flywheel element 2.

The intermediate member 7 projects outwards beyond the annular disks 13 and 14 in the radial direction and extends in this radial outer area between two further annular disks 18 and 19 which are connected by means of pins 20 such that they cannot rotate relative to one another but can rotate relative to the intermediate member 7, because the latter has sufficiently large recesses in the area of the pins 20.

The intermediate member 7 is coupled to the annular disks 18 and 19 via helical springs 21 in fundamentally the same way as it is to the annular disks 13 and 14 via the helical springs 16. Accordingly, the helical springs 21 in the windows 22 (of the annular disks) and 23 (of the intermediate member 7) are arranged tangentially to the flywheel axis on the annular disks 18 and 19 and also on the intermediate member 7.

At its radial outer edge, the annular disk 19 is frictionally clamped between laminate 24 which, in turn, are non-rotatably connected to the flywheel element 1.

Moreover, friction laminae 25 are non-rotatably arranged on the flywheel element 1, between which friction laminae 25 is clamped on annular lamina 26 which, by means of extensions 27 angled in the axial direction, is coupled positively to the intermediate member 7, but with clearance in the peripheral direction. For this purpose, the extension 27 project into recesses 28 on the intermediate member 7 which give the extension 27 the said clearance in the peripheral direction. So that the extensions 27 do not impair the mobility of the intermediate member 7 relative to the annular disks 13 and 14 or the flywheel element 2, openings of adequate size are arranged in the annular disk 14 for guiding through the extensions 27.

Moreover, another lamina 29 can be arranged on the annular disk 14, which lamina 29 sits in frictional contact on a friction lining 30 on the flywheel element 1.

In the arrangement shown in FIG. 4, therefore, the laminae 24, together with the annular disk 18, form the slip clutch 5 according to FIG. 1. The spring mounting groups 3 and 4 according to FIG. 1 are formed by the helical springs 21 and 16. The friction laminae 25 and the annular lamina 26 form the slip clutch 8 in FIG. 1, with a clearance of the extensions 27 in the recesses 28 of the intermediate member 7 in FIG. 4 corresponding to the clearance 2 S in FIG. 1. In the arrangement according to FIG. 4, the slip clutch 6 in FIG. 1 is formed by the lamina 29 and by the friction lining 30.

It can be seen from FIG. 4 that an exceptionally compact method of construction is achieved according to these illustrated preferred embodiments of the invention.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

[In the claims] *We claim:*

1. A split flywheel apparatus for reducing the transmission of vibrations resulting from a transfer of torque from an engine to a transmission line comprising:

a divided flywheel having first and second flywheel elements, said first element having means for be drivingly connected to the engine and said second element having means for [be] *being* drivingly connected to said transmission line, connecting means for drivingly connecting said two flywheel elements together, said connecting means including:

resilient means positioned between said flywheel elements and frictionally connected to said first flywheel element through a first frictional clutch means positioned between said flywheel elements and having frictional contact greater than the maximum transfer torque under normal operating conditions operative only when said normal transfer torque is exceeded, for limiting the torque which can be transmitted under conditions of said maximum torque and, wherein said resilient means fictionally connected to said first flywheel element is arranged on an intermediate member annular means, said intermediate member means being frictionally connected to said first flywheel element through said first frictional clutch means and [notable] *rotatable* with respect to the second flywheel element.

2. An apparatus according to claim 1, wherein said resilient means includes at least two spring group means connected to one another via said intermediate member means and with a second frictional clutch means being arranged inbetween said intermediate member means and one of said flywheel elements, and wherein said second frictional clutch means is arranged in parallel to at least one of said spring group means.

3. An apparatus according to claim 2, wherein said second frictional clutch means is arranged in parallel to only one of said spring group means.

4. An apparatus according to claim 3, wherein said second frictional clutch means comprises more than one frictional clutch wherein each frictional clutch is affected by different clearances.

5. An apparatus according to claim 3, further comprising disk means for connecting said spring group means to said flywheel elements, said disk means having window means for receiving said spring group means in a position tangential to the axis about which said flywheel elements rotate.

6. An apparatus according to claim 5, wherein said disk means comprises a first and second annular disk arrangement, each annular disk arrangement for accomodating one of said two spring group means.

7. An apparatus according to claim 6, wherein said spring group means comprises helical springs arranged in a position tangential to the axis about which said flywheel elements rotate, said spring group means being positioned against windows or recesses of said intermediate member means.

8. An apparatus according to claim 7, wherein one of said spring group means is positioned against windows or recesses of said second annular disk arrangement, said second disk arrangement being non-rotatably connected to said second flywheel element and the other of said spring group means is positioned against windows or recesses of said first annular disk arrangement, said first disk arrangement being frictionally connected to said first flywheel element.

9. An apparatus according to claim 8, wherein said spring group means are arranged concentrically to one another at a different radial distance from the axis about which said flywheel elements rotate.

10. An apparatus according to claim 3, wherein said flywheel elements are directly connected via a friction clutch having a low frictional contact operative between the two flywheel elements when low torques are transmitted.

11. An apparatus according to claim 1, wherein said frictional clutch means is comprised of more than one frictional clutch and wherein each frictional clutch is affected by different clearances.

12. An apparatus according to claim 2, wherein said one of said fly-wheel elements is said second fly-wheel element.

*13. Apparatus for compensating for fluctuations of torque between the output member of an internal combustion engine and the input member of a change-speed transmission in a motor vehicle, comprising a plurality of coaxial flywheels including a first flywheel arranged to receive torque from the output member of the engine and a second flywheel arranged to transmit torque to the input member of the transmission, said flywheels being rotatable relative to each other; and a plurality of dampers disposed in series and operative to oppose rotation of said first and second flywheels relative to each other, said dampers including first and second slip clutches and an elastic damper, one of said slip clutches having means for transmitting torque to said elastic damper and said elastic damper having means for transmitting torque to the other of said slip clutches.*

*14. Apparatus for compensating for fluctuations of torque between the output member of an internal combustion engine and the input member of a change-speed transmission in a motor vehicle, comprising a plurality of coaxial flywheels including a first flywheel arranged to receive torque from the output member of the engine and a second flywheel arranged to transmit torque to the input member of the transmission, said flywheels being rotatable relative to each other; and a plurality of dampers disposed in series and operative to oppose rotation of said first and second flywheels relative to each other, said dampers including first and second slip clutches and an elastic damper, one of said slip clutches being operative to oppose all angular movements of said first and second flywheels relative to each other and including an input element having two confronting friction surfaces arranged to rotate with one of said flywheels and an output element disposed between and in frictional engagement with said surfaces, said elastic damper having an input element receiving torque from said output element, an output element arranged to transmit torque to the other of said slip clutches, and at least one energy storing resilient element between the input and output elements of said elastic damper.*

*15. The apparatus of claim 14, wherein the input element of said elastic damper is rigid with the output element of said one slip clutch.*

*16. The apparatus of claim 15, wherein said other slip clutch has an input element which is rigid with the output element of said elastic damper and an output element which is arranged to rotate with the other of said flywheels.*

*17. The apparatus of claim 16, wherein the output element of said one slip clutch comprises two friction linings which engage said friction surfaces.*

* * * * *